(12) United States Patent
Ramsey

(10) Patent No.: US 6,396,060 B1
(45) Date of Patent: *May 28, 2002

(54) SYSTEM FOR DETECTING RADIATION IN THE PRESENCE OF MORE INTENSE BACKGROUND RADIATION

(76) Inventor: John G. Ramsey, 201 Whistlestop, Pittsford, NY (US) 14534

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/844,161

(22) Filed: Apr. 18, 1997

(51) Int. Cl.$^7$ .................................................. G01J 5/06
(52) U.S. Cl. ..................................... 250/351; 250/338.1
(58) Field of Search ............................. 250/338.1, 351, 250/214 B, 338.3, 338.4, 370.01, 370.12

(56) References Cited

U.S. PATENT DOCUMENTS

| | | | | |
|---|---|---|---|---|
| 4,313,228 A | * | 1/1982 | Berstein ..................... | 359/144 |
| 4,724,312 A | * | 2/1988 | Snaper ................... | 250/214 B |
| 4,963,744 A | * | 10/1990 | Matthys .................... | 250/338.1 |
| 5,189,305 A | * | 2/1993 | Penglase et al. ......... | 250/338.1 |
| 5,391,001 A | * | 2/1995 | Rupert et al. ............. | 250/338.1 |
| 5,564,698 A | * | 10/1996 | Honey et al. ............ | 273/128 R |
| 5,679,953 A | * | 10/1997 | Ananth et al. ........... | 250/338.1 |

* cited by examiner

*Primary Examiner*—Constantine Hannaher
*Assistant Examiner*—Darren M. Jiron
(74) *Attorney, Agent, or Firm*—Neal L. Slifkin, Esq.; Harris Beach LLP

(57) ABSTRACT

A system for sensitively discriminating against background radiation which tends to swamp and prevent detection of radiation from a source of interest such as IR (Infra-Red) light radiation as may be found on "low observable" aircraft collision avoidance lighting, utilizes the modulation of such radiation as a mechanism for tracking the radiation and discriminating against the background radiation, for example, from other light energy sources. The radiation is detected and tracked even though the source of interest produces the radiation in bursts or pulses by controlling the sensitivity of the detector inversely with the amplitude of the radiation to which the detector is exposed, translating the electrical signals into a plurality of cycles at the modulation frequency with the aid of a high Q bandpass filter tuned to the modulation frequency and detecting the output of the filter in a phase-locked-loop detector circuit thereby providing an indication of the intensity of the radiation from the source of interest of an acceptable level. An instrument for detecting the radiation of interest may be portable and of the size approximating that of a conventional flashlight.

13 Claims, 8 Drawing Sheets

FIG. 1
(PRIOR ART)
FIG. 2
(PRIOR ART)
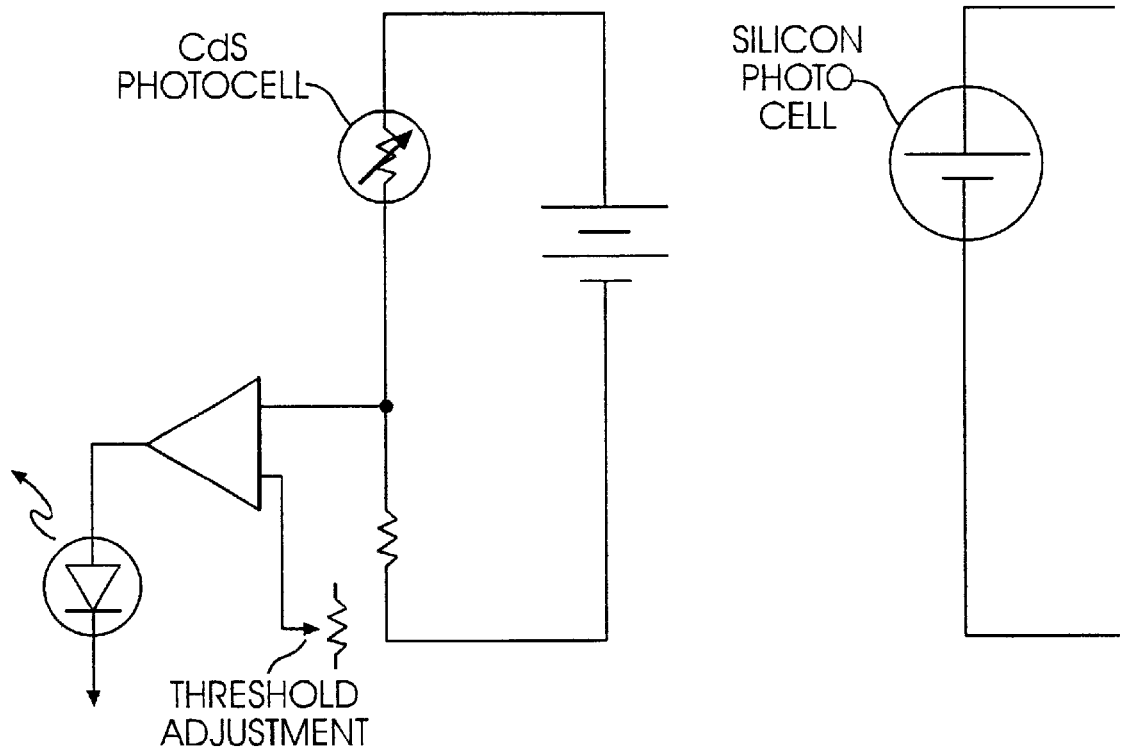
FIG. 3
(PRIOR ART)
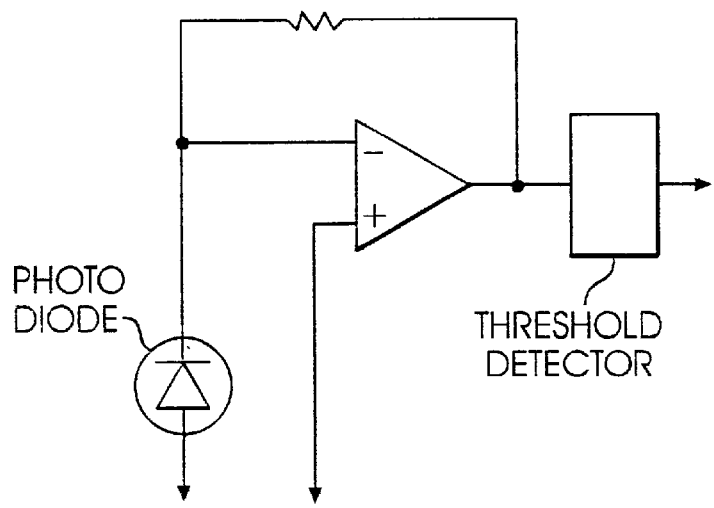

ELECTROLUMINCSENT PANEL

SEMICONDUCTOR LED

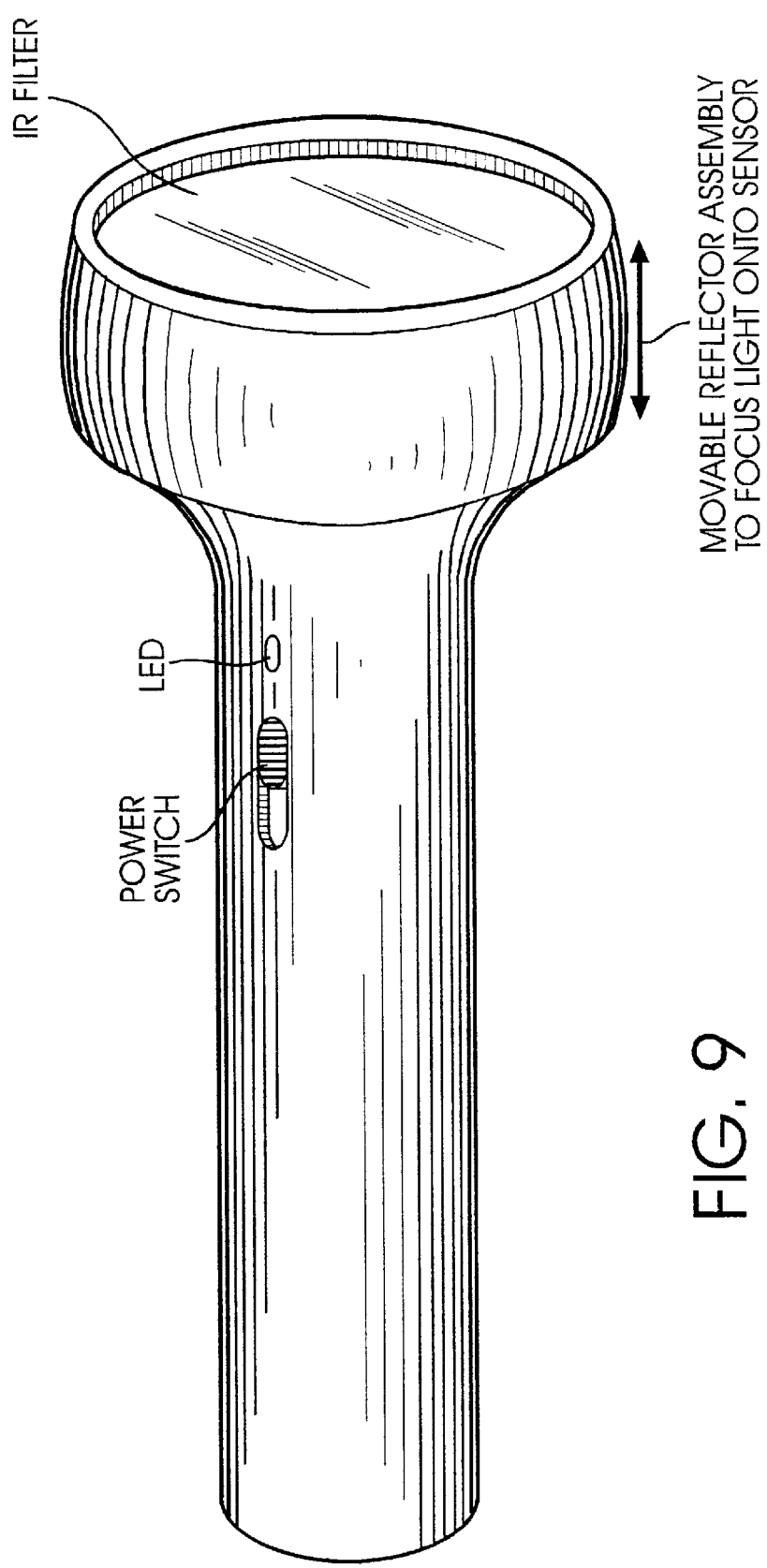

SYSTEM FOR DETECTING RADIATION IN THE PRESENCE OF MORE INTENSE BACKGROUND RADIATION

DESCRIPTION

The present invention is related to a system (method and apparatus) for detecting radiation which may be in the form of light that is both visible and invisible to the human eye. Particularly, the invention provides a portable, sensitive detector of light energy. The method and apparatus provided by the invention is capable of detecting with wide dynamic range, invisible light energy such as IR (Infra-Red) as may be found on "low observable" aircraft collision avoidance lighting. The system provided by the invention detects light from such sources while discriminating against other light sources which may be present and provide light of much greater intensity which illuminate a single, common detector. Such sources include the sun and taxi ramp lighting.

Generally the invention relates to the detection or measurement of radiation and particularly light energy that may not be normally visible to the human eye in order to easily and quickly ascertain the proper operation of sources (emitters) of such light energy, even if invisible to the unaided human eye. It is a feature of the invention to provide a detection system which is simple, low cost, portable, sensitive and reliable. It is a further feature of the invention to provide a system which detects light from such emitters in the presence of illumination which may be of greater intensity than that provided by the emitter, such as the sun or other lighting and it is capable of distinguishing between the emitter of interest and such other emitters, thus enabling identification of emitters of particular interest.

Historically, the detection or measurement of light has involved the measurement of a voltage or resistance change produced by a material or substance that is sensitive to light energy. Most commonly, semiconductors such a silicon, germanium or other materials such as Cadmium Sulfide. A difficulty arises when attempting to measure a relatively low level of light in the presence of a large level of light. For example, trying to detect a small light emitter while being outdoors in the bright sunlight. Various techniques have been used to increase the sensitivity of the detector in the presence of such bright light. Most common are; shielding or shrouding of the detector, direct placement of the detector over the emitter source, the use of optical filters selected to respond only to the wavelength of the emitter, and the use of multiple sensors that measure the light from various points combined with cancellation circuitry. All of these techniques of detection or measurement are based only upon quantifying the intensity of light received and not the frequency or amplitude modulation characteristics of the light received.

As an example, in verifying the proper operation of IR aircraft collision avoidance lighting, pre-flight inspection of the aircraft can take place on a flight ramp in broad daylight. The IR lighting on the aircraft is many orders of magnitude less intense than the ambient light, thus "swamping-out" the very light we are trying to measure. Also, since some of the lighting is not physically accessible, using a detector that requires direct placement over the source is not feasible. In the case of optical filtering, the detector will still allow light within the filter's bandwidth to reach the detector. In this particular case, the sun's ambient light has a major portion of its energy within the very bandwidth we wish to measure.

An objective of the invention is to provide a low cost, light detector system that is sensitive to the modulation characteristics of a light source, the invention is especially suitable to detect the emission of IR light from aircraft collision avoidance lighting. Present and future warfare technology capitalizes on night operation. The darkness rendering the forces less visible to ordinary participants. Night vision goggles as used by aircraft pilots are responsive to IR light. Team aircraft are equipped with suitable IR collision avoidance lighting to allow formation flying with other aircraft whose pilots are equipped with night vision goggles. Thus the aircraft lighting is visible to night vision users, but invisible to normal unaided human vision. Pre-flight inspection of aircraft before flight requires check out of this lighting, often under battle conditions or other such difficult environments. A simple portable hand-held detection device that is easily used by non-technical personnel is needed.

Among the available electrical power on aircraft is 400 Hz AC. If this power source is used to power the lighting, a valuable benefit results in that the light will be modulated with this frequency. Ambient lighting from the sun or taxi ramp is not of this frequency, thus allowing easy discrimination of the light. It is the purpose of this invention to produce a detector system that responds specifically to such modulated light.

Use of this frequency discrimination technique is not limited to aircraft. Various equipment could be equipped with suitable light sources of different frequencies, thus enabling the night vision equipped user to determine what source he is viewing. For example, friendly military tanks could be assigned frequency A, while jeeps frequency B. Thus a night vision equipped pilot or commander could immediately identify such equipment in the darkness of night.

The foregoing and other objects, features and advantages of the invention as well as a presently preferred embodiment thereof will become more apparent from a reading of the following description in connection with the accompanying drawings in which:

FIGS. 1, 2 and 3 are simplified schematic diagrams illustrating prior art circuits for detection of illumination in the presence of background illumination of intensity which is of the order of magnitude of, or exceeds the intensity of, the illumination of interest;

Figure 7:
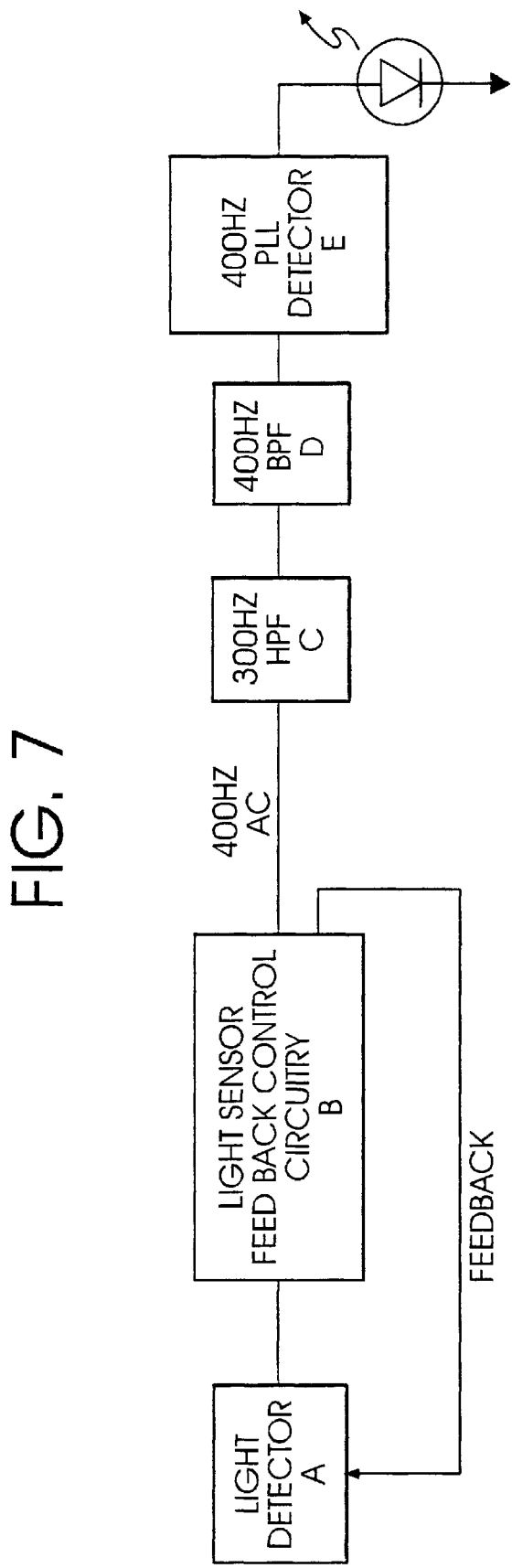
FIG. 7 is a block diagram illustrating a system in accordance with a presently preferred embodiment of the invention.
Figure 8A:
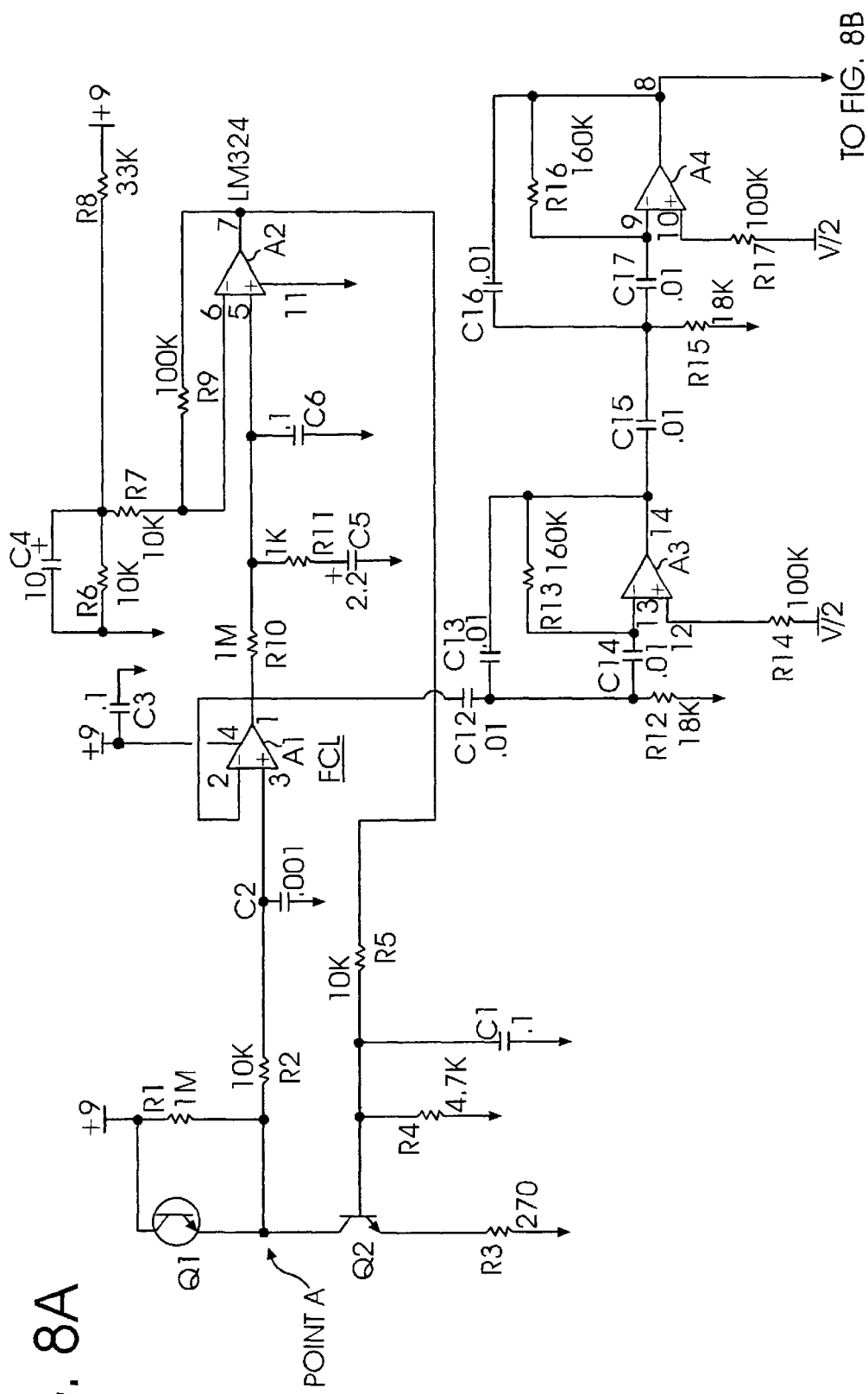

FIGS. 8A, B and C are a schematic diagram of the system illustrated in FIG. 7; and FIG. 9 is a perspective view of a portable device of approximately the same size as a flashlight in which the system of FIGS. 8A, B and C may be incorporated.

FIGS. 1–3 are examples of prior art utilizing different types of detectors married with a comparator threshold detector to illuminate an LED, light emitting diode, indicator. Each circuit requires setting of the threshold adjustment to the edge of triggering when in the presence of ambient light. When the detector then senses additional light from the source it is designed to detect, the comparator switches and illuminates the indicator LED. Note that the threshold adjustment must be readjusted whenever the ambient light changes and that the detector is designed to respond only to the amount of light impacting upon the detector. It should be noted that any of the detectors also detects any amplitude modulation that may be on the light source, but this modulation, if any, is not employed.

Figure 4:
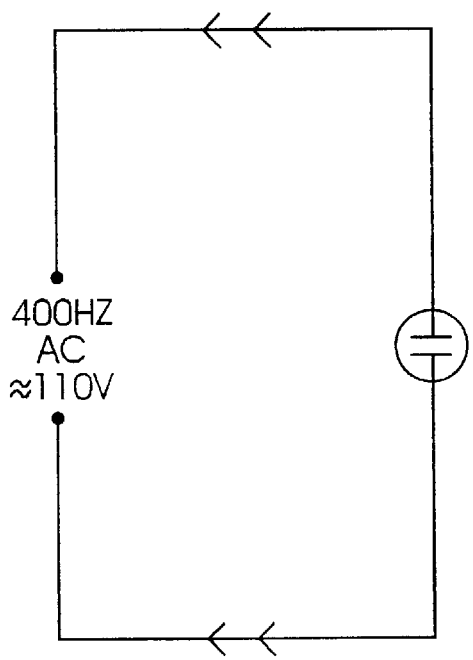
FIGS. 4 and 5 illustrate the modulation of illumination from an emitter of interest.
Figure 5:
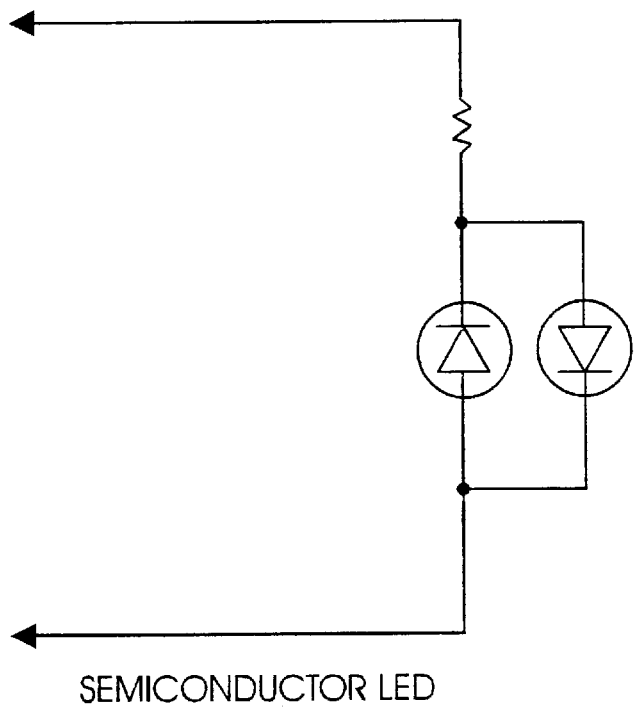

FIGS. 4 and 5 outline various methods of powering light emitters as could be found on aircraft. It can be seen that FIGS. 4 and 5 will both cause the light output from the emitter to be modulated at a 400 Hz rate due to the AC excitation signal.

Figure 6:
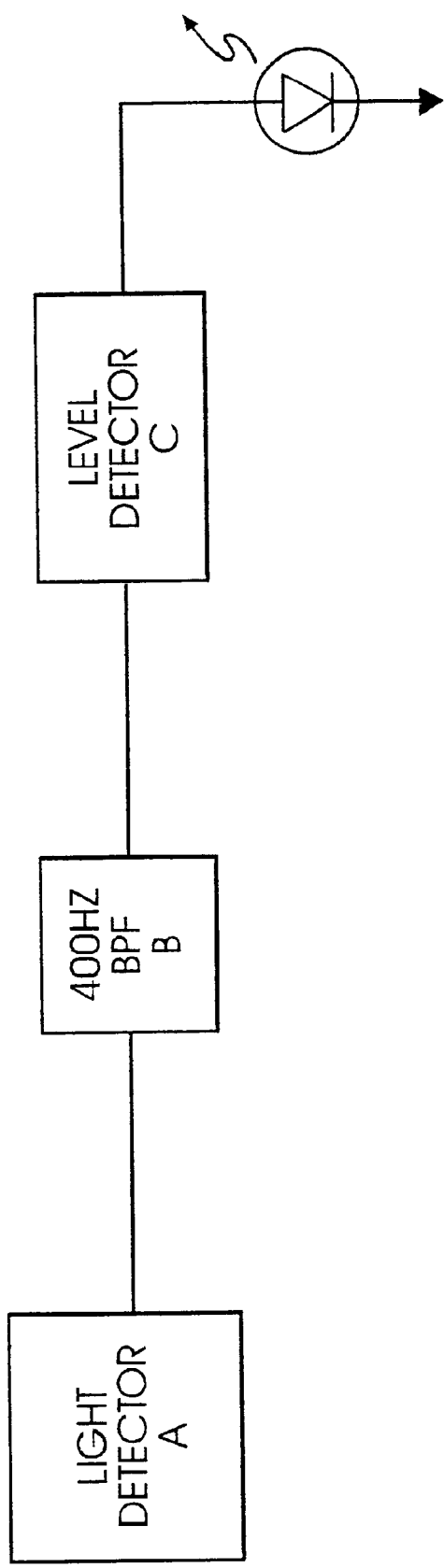
FIG. 6 is a simplified block diagram of a system embodying the invention.

FIG. 6 shows an implementation of the invention in its most basic form. The light detector, A, can be of the form of any of the detectors as shown in FIGS. 1–3. The 400 Hz bandpass filter is designed to allow only the detected amplitude modulated signal from the detector to pass. The Level detector, 3, is designed to illuminate the indicator LED whenever a 400 Hz signal emerges from the 400 Hz bandpass filter.

FIG. 7 shows the preferred embodiment of the invention. The light detector, A, is contained within a feedback control loop that automatically compensates for ambient light by detecting the static level of light and rebiasing the detector to place it in its most optimum area of operation, avoiding any threshold adjustments. The 400 Hz modulation signal (which may be called a first signal) is coupled off and presented to a 300 Hz high pass filter before being applied to a 400 Hz bandpass filter. The 400 Hz bandpass filter allows the 400 Hz modulation signal to pass through (thereby providing what may be called a second signal) while rejecting other signals. The 400 Hz signal is then detected by a phase-locked-loop frequency detector (a type of synchronous detector) which will illuminate the indicator LED when the proper 400 Hz signal is present. PLL detector is used and designed to have fast lock-up time and long "hang" time after detection. This allows LED to stay lit for a second or so even if PLL detects only a few cycles of 400 Hz, as discussed in greater detail hereinafter. Detecting such modulation according to the invention can also be used to selectively detect different light sources which are modulated by different frequencies. To do so, it is only necessary to retune the associated filters and PLL to the desired frequency to match the emitter.

The present embodiment of the invention provides several improvements and advantages over prior art light detectors. These improvements include more sensitivity, freedom from user adjustments for ambient light, response to only particularly modulated light, and ease of operation.

FIG. 8A shows a light sensor feedback control loop when the photodetector transistor, Q1, produces a current that is proportional to the light it receives, typical variations in ambient light are on the order of 5 or 6 magnitudes (100,000–1,000,000:1). It is desirable to operate the detector in its most linear region for best sensitivity, but over such a large range it is difficult. Prior art sensors used various operator adjustments to balance out or compensate for these extremes. A feedback control loop, FCL, is used to automatically center the detector to operate in its most efficient region. Feedback loops are not uncommon, however this FCL loop is designed to keep the detector in the optimum region for detection of 400 Hz source modulated light. Typically, ambient light is either DC, the sun, or of a low frequency such as 60 Hz electrical mains lighting, in these cases the feedback loop effectually cancels their effect.

The combination of Q1 and Q2 form a voltage divider whose voltage at point A is monitored by operational amplifier, A1, which is configured as a voltage follower. If the ambient light level is high, sensor transistor Q1 produces more current causing the voltage at point A to rise. The output of A1 is amplified by opamp A2 which then controls current sink transistor Q2 to sink more of sensor transistor Q1's current to ground, dynamically adjusting the light sensing portion of the circuit to be in the optimum region for detecting a modulated light source. Loop filter components R10,11 C5,6 characterize the loop for the desired dynamics of canceling out static or low frequency components from the sensor. The signal from the feedback control loop (FCL), which has been called the first signal, goes to the 300 Hz high pass filter.

FIGS. 8A and B show the 300 Hz high pass filter and 400 Hz bandpass filter (UI). Opamps A3 and A4 comprise a high pass filter that limits the amount of undesired low frequency signal that the 400 Hz bandpass filter receives. The 400 Hz bandpass filter utilizes a switched capacitor filter which provides high Q and small size. Many different filter topologies could be used here, although the use of a high Q band pass filter is required. A high Q filter is required not only for its bandpass characteristics, but also for its ringing characteristics as will become apparent. If the light sensor is used to detect a strobe light as may be found on an aircraft, the light pulse will cause the filter to ring, producing a plurality of cycles (long burst) of 400 Hz energy (the second signal) that the following PLL detector will respond to, thus allowing the light sensor to respond to such strobe lighting. In the present embodiment, a switched capacitor bandpass filter is used since such a filter is small, easily and precisely tuned using a stable digitally derived clock.

Figure 8B:
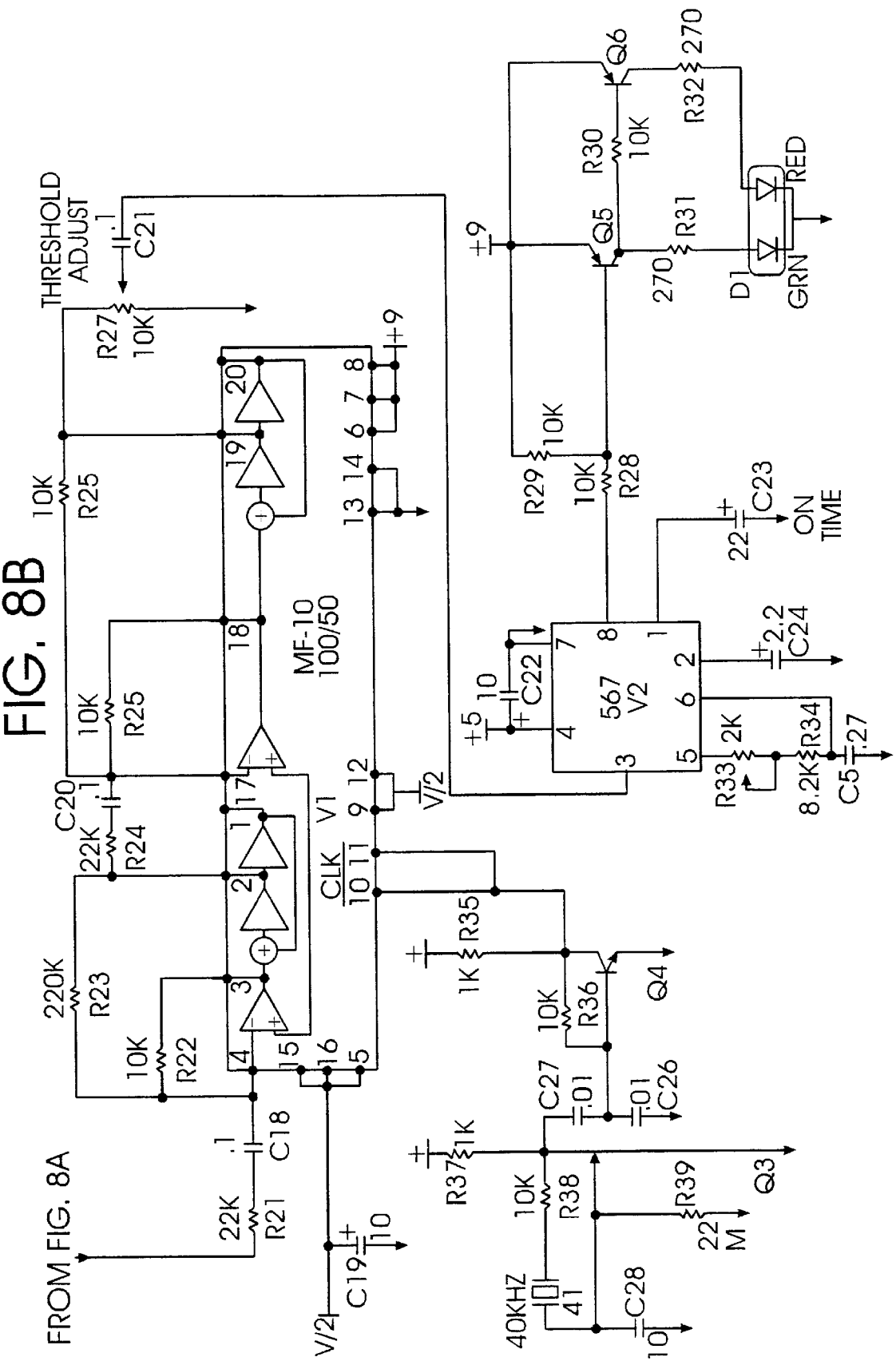

FIG. 8B also shows the 400 Hz phase-locked-loop PLL detector. The PLL detector detects the 400 Hz energy from the output of the bandpass filter and provides an output to illuminate an indicator light emitting diode LED. The PLL dynamics are chosen so that the loop will lock rapidly upon the 400 Hz signal and remain on for a short period of time after signal decay, this period of time being long enough to allow an operator to see the LED illuminated. In this way a short burst of 400 Hz energy (as from a strobe light) will be observable by the operator. Although many different forms of annunciators could be used, the present embodiment uses a two color LED that glows red normally and turns green upon detection of 400 Hz energy, thus making the light sensor easy to operate and interpret.

Figure 8C:
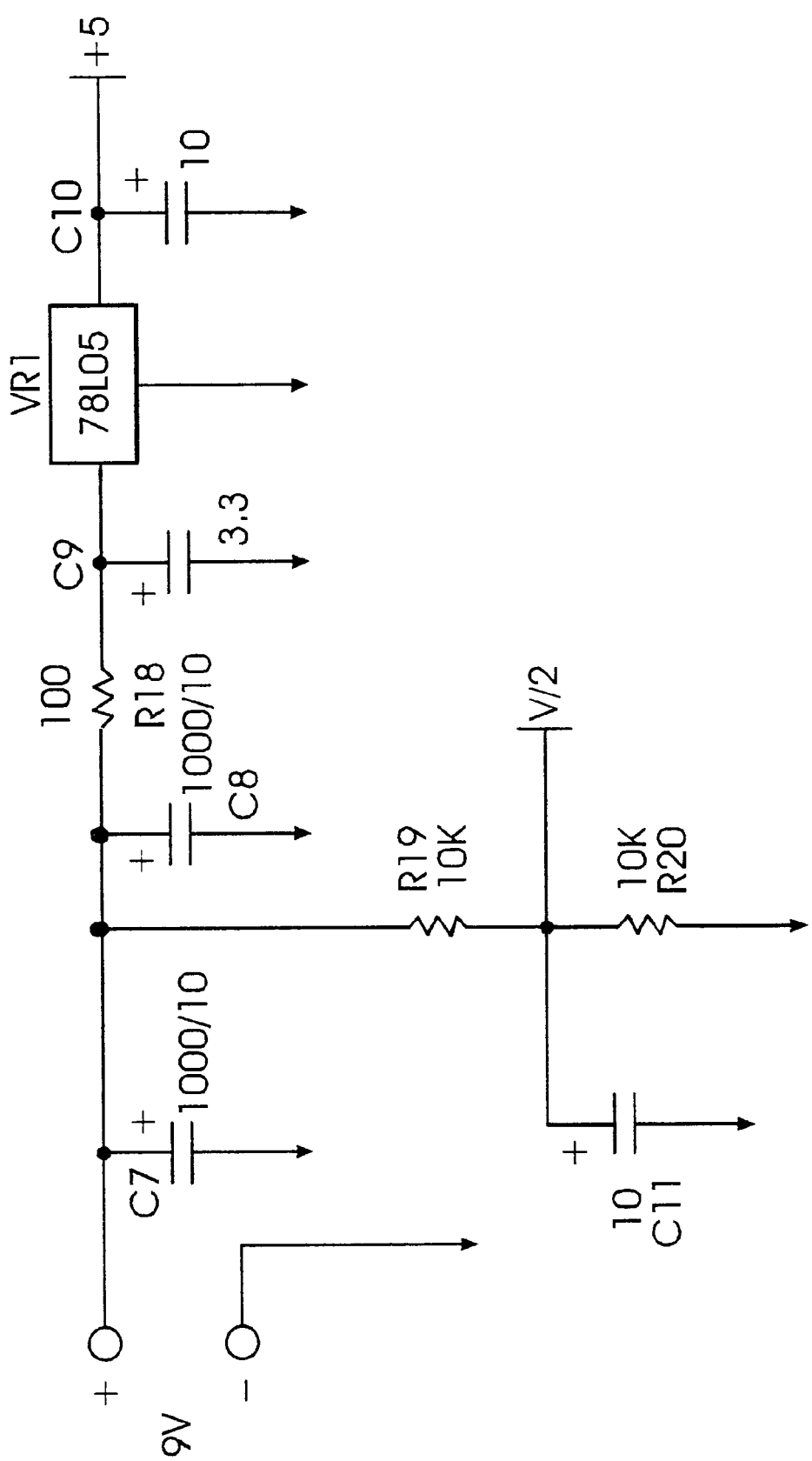

FIG. 8C shows a generally conventional power supply for providing operating voltage to the circuits of FIGS. 8A and B.

The values of the components are in ohms for resistors (R) and microfarads for capacitors (C). U 1 & 2 & VR-1 are suitably of the type indicated in the drawing. The values and types indicated are given by way of illustration and not limitation. Other component types and values may be used to implement the system of the invention.

FIG. 9 shows a housing similar to a standard hand held flashlight. The sensor is placed at the focal point of a reflector, using lens and reflector optics to concentrate and provide a measure of directionality to the assembly. This arrangement has a reflector able to be easily moved or adjusted axially so as to change the focal length of the optics to optimize detection distance.

The previous description of the preferred embodiment is provided to enable any person skilled in the art to make or use the present invention. The various modifications to these embodiments will be readily apparent to those skilled in the art, and the generic principles defined herein may be applied to other embodiments without the use of inventive faculty. Thus, the present invention is not intended to be limited to the embodiments shown herein but is to be accorded the widest possible scope consistent with the principles and novel features disclosed herein.

I claim:

1. A method for detecting the presence of radiation from an aircraft collision avoidance lighting source in the presence of background radiation of the same or greater order of intensity as the intensity of said source, which comprises the steps of modulating the radiation produced by said source so that said radiation from said source has a characteristic unique to the modulation thereof, and detecting said radiation from said source in the presence of said background radiation while discriminating against said background radiation which does not have said unique characteristics, wherein said discriminating step is carried out by providing an electric signal corresponding to said radiation, and further wherein said radiation from said source occurs in bursts or pulses, and filtering said signal by translating during said filtering said electric signal into another signal which corresponds to a plurality of cycles of said modulation during said pulses or bursts by causing ringing in response to said pulses or bursts in said filtering step.

2. The method according to claim 1 wherein said characteristic is the frequency of modulation.

3. The method according to claim 1 wherein said radiation detecting step is carried out by controlling during said detecting step the sensitivity of detection of said radiation from said source and said background inversely with respect to the intensity of said radiation from said source and said background.

4. The method according to claim 2 wherein said filtering step is carried out with the aid of a high Q band pass filter which passes signals of approximately said frequency of modulation.

5. The method according to claim 2 wherein said detecting step is carried out by synchronously detecting said electrical signal having said frequency of modulation.

6. The method according to claim 5 wherein said synchronously detecting step is carried out with a phase lock loop detector.

7. The method according to claim 1 wherein said modulating step is carried out by powering said source with energy having said unique characteristic.

8. The method according to claim 7 wherein said energy is AC electrical power and said unique characteristic is the frequency of said AC power.

9. A method for detecting the presence of radiation from an aircraft collision avoidance lighting source which occurs in pulses or bursts in the presence of background radiation of the same or greater order of intensity as the intensity of said source, which comprises the steps of modulating the radiation produced by said source, so that said radiation from said source has a characteristic unique to the modulation thereof, detecting said radiation from said source in the presence of said background radiation while discriminating against said background radiation which does not have said unique characteristics, wherein said detecting step is carried out to provide a first electrical signal, by controlling the sensitivity of detection of said radiation from said source and said background inversely with respect to the intensity of said radiation from said source and said background, filtering said first electrical signal by translating during each of said pulses or bursts said first electrical signal by causing ringing in response to said pulses or bursts during said filtering step into a second electrical signal, which corresponds to a plurality of cycles of said modulation, and wherein said second electrical signal is synchronously detected by being locked to said modulation.

10. The system of claim 9 when said radiation from said source and said background is light.

11. The system of claim 10 when said radiation from said source and said background is IR light.

12. Apparatus comprising in combination means for detecting the presence of radiation from an aircraft collision avoidance lighting source in the presence of background radiation of the same or greater order of intensity as the intensity of said source which detecting means comprises means for modulating the radiation of said source so that said radiation from said source has a characteristic unique to the modulation thereof, and means for detecting said radiation from said source and the presence of said background radiation, which includes means for discriminating against said background radiation which does not have said unique characteristics, and wherein said radiation from said source to be detected occurs in pulses or bursts, and said detecting means includes filtering means operative to ring in response to said pulses or bursts and translate during said pulses or bursts an electrical signal corresponding to said radiation into another signal which corresponds to a plurality of cycles of a frequency at which said modulation occurs.

13. Apparatus according to claim 12 further comprising means responsive to said plurality of cycles of said frequency of modulation for synchronously detecting another signal by being locked to said frequency of modulation.

\* \* \* \* \*